Sept. 10, 1946. S. KRETCHMAN 2,407,428
COVER REMOVING TOOL
Filed June 30, 1943
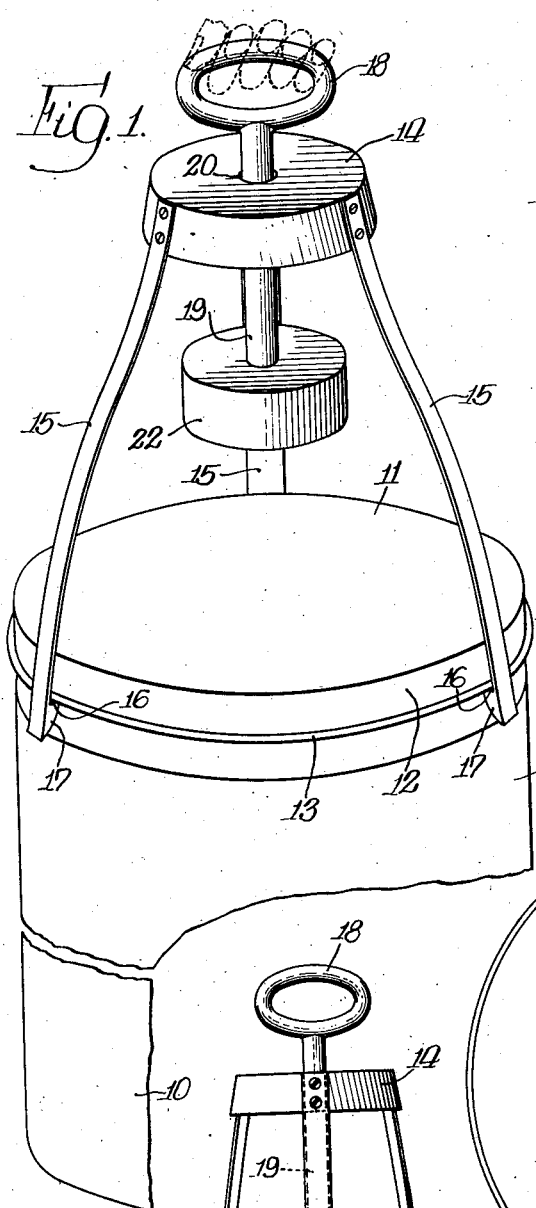
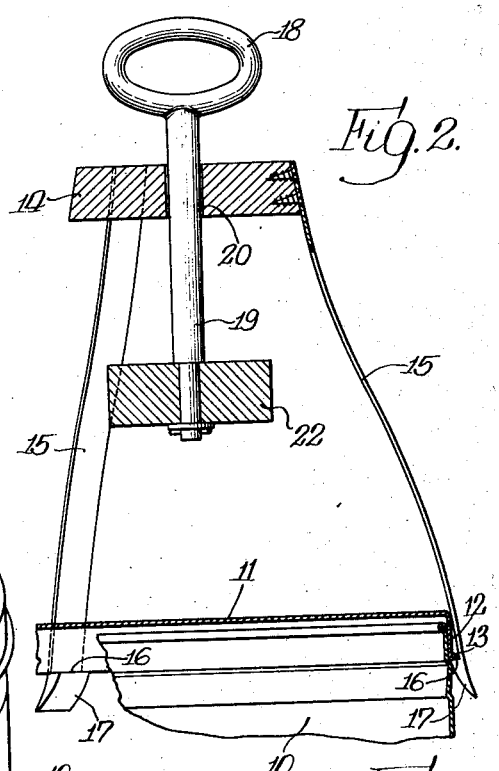
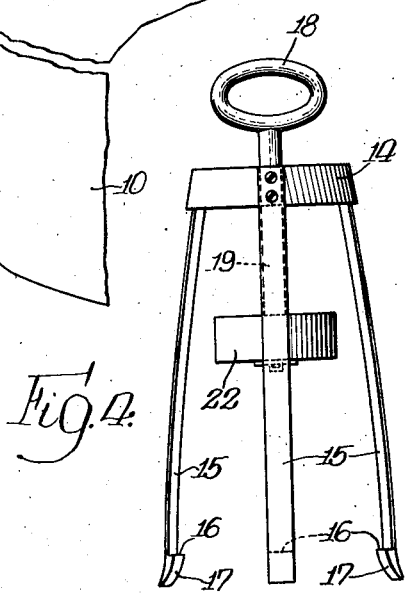
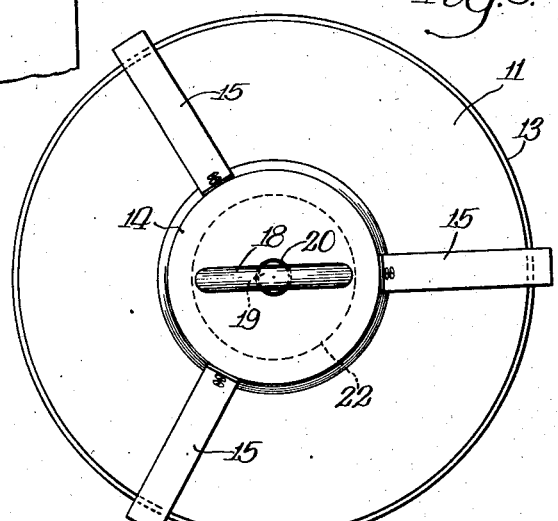
INVENTOR.
Stanley Kretchman,
BY
Attys.

Patented Sept. 10, 1946

2,407,428

UNITED STATES PATENT OFFICE 2,407,428

COVER REMOVING TOOL

Stanley Kretchman, Chicago, Ill.

Application June 30, 1943, Serial No. 492,824

4 Claims. (Cl. 81—3.46)

This invention relates to a cover-removing tool to enable the covers of containers to be readily removed without undue disturbance or spilling of the contents of the container or such injury or damage to the cover or container that will render either unfit for further use.

Thus, in the case of eggs for bakeries and the like, the eggs are uniformly furnished in bulk, that is, in containers of the frozen-egg product. The bakeries then open the containers when and as they use the eggs, the frozen product meanwhile having become softened into a more or less liquid form.

But the covers on these containers, while of usual form, that is, a flat disc covering the entire top of the container with a peripheral depending edge band overlapping the upper end of the body of the container for about an inch and having a slightly enlarged edge rim or roll formed by turning back the material, are made tight-fitting to preserve the contents and protect the same from contamination and leakage when the contents soften and to enable the containers to be handled in shipment and otherwise without dislodgement of the covers.

Accordingly, the bakeries or users of the containers have difficulty in removing the covers when they are ready to make use of the contents. Without going into the pangs and penalties involved in the details of such efforts, suffice it to say that substantial spillage results therefrom, a considerable loss of labor occurs, and the covers and upper ends of the containers are so damaged and injured that they are uniformly unfit for re-use.

Now there is a demand and an established market for such empty frozen-egg containers if the covers and containers have not been damaged in opening or otherwise. One common use is for merchandising other edibles. So that a bakery using such containers—and some use a very large number—is not only aiding in the conservation of material, labor and expense, by preserving the containers in good condition for resale, but is financially rewarded therefor.

It is an object of my invention, therefore, to provide a convenient cover-removing tool by means of which the covers of such containers may be readily and easily removed by anyone without ruffled temper, without undue disturbance of the contents, without spillage and without injury to the cover or container, whereby the same may be re-used for purposes for which they may be adapted.

Another object is the provision of such a tool which is manipulated by hand to place the same down over the top of a container suitably to engage the cover, and by manipulating and lifting the same the cover is lifted and removed from the container.

Another object is the provision in such a tool of means for removing the cover by an upward or longitudinal pull exerted equally at equally spaced intervals on the lower rim edge of the cover.

Another object is the provision in such a tool of means for imparting a sudden force like a hammer blow in an upward direction against the lower rim edge of the cover at equally spaced points around the rim, said blows being delivered simultaneously and in equal amounts to start the sticking cover from its closed position.

Another object is the provision in such a tool of a plurality of depending inwardly spring-tensioned arms circularly arranged at equal distances apart and adapted to be dropped down over the top of the container, so that inside hook edges at the ends of the arms, which are spring-pressed against the sides of the container, engage under the rim edge of the cover when the tool is lifted, and the cover is lifted from the container body by direct upward or longitudinal pull exerted equally at equally spaced points around the cover rim.

Another object is the provision in such a tool of outwardly beveled or slanting ends of the inwardly sprung depending arms to aid in sliding the same over the top of the containers and down its sides.

Another object is the provision in such a tool having telescoping arms overlapping the top of the container and hooking or engaging under the lower rim edge of the cover, of means for delivering hammer-like blows in an upward direction on said arms, to thereby start the sticking cover moving upwardly.

A further object is the provision in such a tool of a hand-hold by which the tool is applied down over a container top and then operated to deliver hammer-like blows upwardly on the rim edge of the cover to start the same opening and then used to lift the tool and cover off the container.

Further objects and advantages will appear from the description and claims to follow, in connection with the accompanying drawing, which illustrates an embodiment of the invention, and in which drawing—

Figure 1 is a perspective elevational view showing the tool as applied to a container and cover of the usual type, the tool being in position just before starting the upward motion to remove the cover;

Fig. 2 is a vertical sectional view of the same showing a portion of the top of the container and cover in section, with the inside hooks on two of the arms engaging under the rim of the cover. The body portion through which the stem of the hand-hold passes and the weight at the bottom of the stem are also shown in section;

Fig. 3 is a top plan view of the device and container of Fig. 1; and

Fig. 4 is a side elevation of the tool on a smaller scale showing the position the spring arms may assume when the device is not in use.

In the drawing, the can 10, which may be any suitable container made of metal, plastic, fibre, or other desirable material, is indicated in outline and is provided with a cover 11 which has a depending edge flange 12 having an up-rolled or formed lower edge or projecting rim 13. This forms a rounded and strengthened edge or rim on the cover flange. The usual container for the bakery trade, which is the one here depicted, may be a thirty-pound capacity container approximately 10 inches in diameter and about 12 inches in height. Other containers may and do have other dimensions. The invention is applicable thereto as well, as will hereinafter appear.

The tool itself, in the form here shown, comprises a body portion or supporting plate or disc 14 of wood or metal, having depending spring arms rigidly secured in any desired way at their upper ends to the plate or block 14, said arms having inside hooks or ledges 16 and outwardly beveled and slanting portions 17 at their lower free ends or tips.

These upwardly faced inside hooks 16 are adapted to engage under the strengthened edge or rim of the cover flange, as indicated in Figs. 1 and 2 of the drawing, when the arms 15 are pressed down over the top of the container and raised.

The inwardly spring-tensioned or spring-pressed arms 15, which are preferably simple strips of spring steel, are curved, as indicated, or formed so that when sprung apart from their normal position, shown in Fig. 4, to engage a container top, the arms do not strike the upper edge of the cover, even with the largest size can, when an upward pull is exerted on the arms to free the cover.

In order conveniently to handle and manipulate the tool, it is provided with a hand-hold 18, which may be grasped by the hand, as indicated in dotted lines in Fig. 1, the hand being shown in the act of pulling on the knob after the tool has been applied to the container.

This handle is carried on a stem 19 passing centrally through the supporting disc 14 in a sliding bearing 20 in said disc. This bearing is sufficiently long to give lateral support to the stem or handle or knob to enable the tool to be readily manipulated in applying it to a container and otherwise.

While the arms exert a distributed upward pull on the flange of the cover longitudinally or parallel with the axis of the container to pull the same off without twisting and binding on the container, the cover tends to stick in place due to its natural close fit and tightness and the stationary set or friction of rest of the materials. In order to overcome this tendency of the cover to stick, it is desirable to impart one or more upward blows on the rim of the cover to jar the same loose and start it moving. These blows should be substantially equally spaced, about equal in force, and simultaneously applied. In order to do this, the stem 20 carries at its lower end, projecting some distance below the plate 14, a block 22, preferably of any suitable material, which is secured to the stem, as shown, or in any desired manner. When the tool is in place on the container, as shown in Figs. 1 and 2, and the handle and stem are pulled upward, the block 22 strikes against the lower side of the support 20 with a hammer-like blow of greater or less intensity, depending on the nature of the pull on the handle. The force of this blow is distributed substantially equally to the arms 15 and through them, in an upward direction, to the hooks 16 and the rim of the cover at the several points of engagement of the hooks therewith. This may be repeated as many times as desired to effect the start and removal of the cover.

In placing the tool on a substantially large container, it may be conveniently done while the same is held in the hand by tipping the tool so as to catch one hook under the cover rim, and then, by righting the tool and pushing downwardly thereon, the other two arms will slip over the farther edge of the cover and down to catch under the rim. This operation, of course, may be assisted by manually spreading the arms apart and guiding them to position. In all these operations, the outwardly slanting tips 17 of the arms assist in guiding the same over the container top and sides and afford a sharp hook edge to enable it the better to enter under the rim of the cover. If the container be small enough so that the edge of the cover strikes on the bevels 17 when the tool is lowered over the container, the same may be applied by direct downward thrust. And if but one size of container is used by a purchaser, the tool may be made, as by the set of curvature of the arms or otherwise, so that the normal position of the arms will make their slanting edge 17 just strike the edge of the top of the container and the tool may then be dropped down over the cover so that the weight of the tool will cause the slanting edges 17 to spread and move down over the cover edge to bring the hooks 16 under the rim of the cover flange.

Then, as above stated, a sudden pull on the handle, in effect, taps or strikes upwardly, like a hammer-blow, on the rim of the cover at the several places, equally and simultaneously. This is the most effective place and direction for the application of such blows, which can be done without injury to the cover or container. If the cover does not start immediately, the blows may, of course, be repeated.

The placing of the curved spring arms under tension by the pull from the hammer-blow causes the hooks on their lower ends to spring upwardly with the cover, once it starts to loosen, and the continued upward pull on the handle of the tool lifts the cover entirely off the container, when it may be manually freed therefrom and preserved for future use. Thus, it will be understood that the friction of rest between the rim 12 of the cover and the upper end of the container and the coefficient of friction at that time and place are much greater than the friction of motion and the coefficient of friction after the cover starts moving. It is preferable, therefore, once the grip of the cover is broken, to start it moving immediately and keep it moving. The storing up of energy in the spring arms by tending to straighten them by the first strong yank or pull on the handle not only softens the blows but assists in this action of instantly starting and keeping the cover moving, since even though the blow may tend to stop the motion of the hand, if the cover breaks away the return of the spring arms to normal form instantly starts and lifts the cover up. Of course, the hand is still pulling on the handle, so that once the cover starts, the combined action of the spring arms and the hand results in pulling the cover entirely off without stoppage.

The hooks 16 on the arms 15, or hook-ledges, are relatively wide, that is, in this instance as wide as the arms 15, so that the rim-edge of the cover is not liable to injury thereby in being pulled off the container. The rim edge itself of the cover is strengthened and enlarged somewhat by being rolled back and over, and this affords a suitable place for the application of the removing hooks without danger of injury to the container or cover.

The entire result is that, although these containers are easily dented and injured, the covers may be readily and easily removed without spillage or disturbance of the contents and without marring or disfiguring the containers or covers.

While three such spring-pressed arms are shown and are preferred, their number may be varied, if desired, as will be obvious. Their construction and form may likewise be modified, as desired.

Other modifications may be made, and it is contemplated by the appended claims therefor to cover any such modifications as fall within the true spirit and scope of this invention.

Having thus described the invention, what is claimed and desired to be secured by Letters Patent is:

1. A cover-removing tool for containers comprising a support, spring arms secured to said support and having their lower ends provided with inside hooks and outwardly slanting tips, said arms being circularly arranged and spaced on the support and adapted with the aid of the slanting tips to be dropped down over the end of a container with the hooks engaging under the enlarged rim edge of the cover when the tool is thereafter raised, a stem sliding through the support, a handle on the upper and outer end of the stem by which the stem and tool are operated, a stop on the stem below the support and spaced therefrom when the handle is pressed down, whereby when the tool is in place on a container and a sudden pull is given the handle the jerk or blow caused by said stop on the stem engaging the support is transmitted through the arms and hooks to the rim edge of the cover whereby to loosen the same and the continued pull on the handle entirely to remove the cover from the container.

2. A cover-removing tool for containers, comprising a supporting disc, a plurality of spring arms secured at their upper ends to the disc in spaced circular relation and having inside hooks at their lower ends, a stem slidingly mounted centrally of the disc, a hand-hold on the outer end of the stem by which the tool is manipulated and the arms pressed down over the top of a covered container until the hooks engage under the rim edge of the cover, and a block mounted on the lower end of the stem and spaced from the disc but adapted to strike the lower side of the disc with a hammer-like blow when the handle is suddenly jerked upwardly.

3. A cover-removing tool for containers, comprising a supporting member, a plurality of spring arms secured to said member and depending in circular spaced relation therefrom and adapted to be dropped down over a covered container, relatively wide hook ledges on the insides of the arm ends to engage under the rim edge of the cover when the tool is raised, a handle for the tool above the supporting member by which the tool is handled and manipulated, a weight normally spaced below the member, and a connection between the handle and weight to cause the latter by manipulation of the handle to strike an upward blow on the under side of the member and in effect on the under side of the rim to start and pull the cover off the container.

4. A cover-removing tool for containers comprising a support, spring arms secured to said support and having their lower ends provided with inside hooks, said arms being circularly arranged and spaced on the support and adapted to be dropped down over the end of a container with the hooks engaging under the enlarged rim edge of the cover when the tool is thereafter raised, a stem sliding through the support, a handle on the upper and outer end of the stem by which the stem and tool are operated, a stop on the stem below the support and spaced therefrom when the handle is pressed down, whereby when the tool is in place on a container and a sudden pull is given the handle the jerk caused by said stop on the stem engaging the support is transmitted through the arms and hooks to the rim edge of the cover whereby to loosen the same and the continued pull on the handle entirely to remove the cover from the container.

STANLEY KRETCHMAN.